(12) United States Patent
Wilhelm et al.

(10) Patent No.: US 9,565,093 B1
(45) Date of Patent: Feb. 7, 2017

(54) SYSTEMS AND METHODS FOR ANTICIPATING FILE-SECURITY QUERIES

(71) Applicant: Symantec Corporation, Mountain View, CA (US)

(72) Inventors: Jeffrey S. Wilhelm, Venice, CA (US); Joseph H. Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 226 days.

(21) Appl. No.: 14/570,518

(22) Filed: Dec. 15, 2014

(51) Int. Cl.
    *G06F 15/16* (2006.01)
    *H04L 12/26* (2006.01)
    *H04L 29/08* (2006.01)
    *H04L 29/06* (2006.01)

(52) U.S. Cl.
    CPC ........... *H04L 43/16* (2013.01); *H04L 29/06* (2013.01); *H04L 29/08072* (2013.01)

(58) Field of Classification Search
CPC ..... H04L 29/06; H04L 29/08072; G06F 21/55
USPC ........... 709/203, 220, 224, 223, 228; 726/14
See application file for complete search history.

(56) References Cited

U.S. PATENT DOCUMENTS

| | | | | |
|---|---|---|---|---|
| 7,899,901 B1* | 3/2011 | Njemanze | ............. | G06F 21/552 709/223 |
| 8,056,130 B1* | 11/2011 | Njemanze | ............... | G06F 21/55 709/224 |
| 8,560,679 B2* | 10/2013 | Njemanze | ............. | G06F 21/552 709/223 |
| 8,843,997 B1* | 9/2014 | Hare | ................... | H04L 63/0281 709/200 |
| 9,043,903 B2* | 5/2015 | Diehl | ........................ | G06F 9/46 726/22 |
| 9,405,903 B1* | 8/2016 | Xie | ......................... | G06F 21/56 |
| 2008/0177994 A1* | 7/2008 | Mayer | .................. | G06F 9/4418 713/2 |
| 2011/0145711 A1* | 6/2011 | Njemanze | ............. | G06F 21/552 715/736 |
| 2014/0283065 A1* | 9/2014 | Teddy | ................... | H04L 63/145 726/23 |

OTHER PUBLICATIONS

"Patch Tuesday", http://en.wikipedia.org/wiki/Patch_Tuesday, as accessed Oct. 15, 2014, Wikipedia, (Dec. 15, 2005).

\* cited by examiner

*Primary Examiner* — Khanh Dinh
(74) *Attorney, Agent, or Firm* — Fisherbroyles LLP

(57) ABSTRACT

The disclosed computer-implemented method for anticipating file-security queries may include (1) monitoring queries from client devices for information that describes the security of files, (2) determining that a threshold number of the client devices are querying for information describing the security of a file within a threshold amount of time, (3) anticipating, based on the determination, that at least one client device that did not query for the information will query for the information, and (4) delivering, in response to anticipating that the client device that did not query for the information will query for the information, the information to the client device that did not query for the information. Various other methods, systems, and computer-readable media are also disclosed.

20 Claims, 9 Drawing Sheets

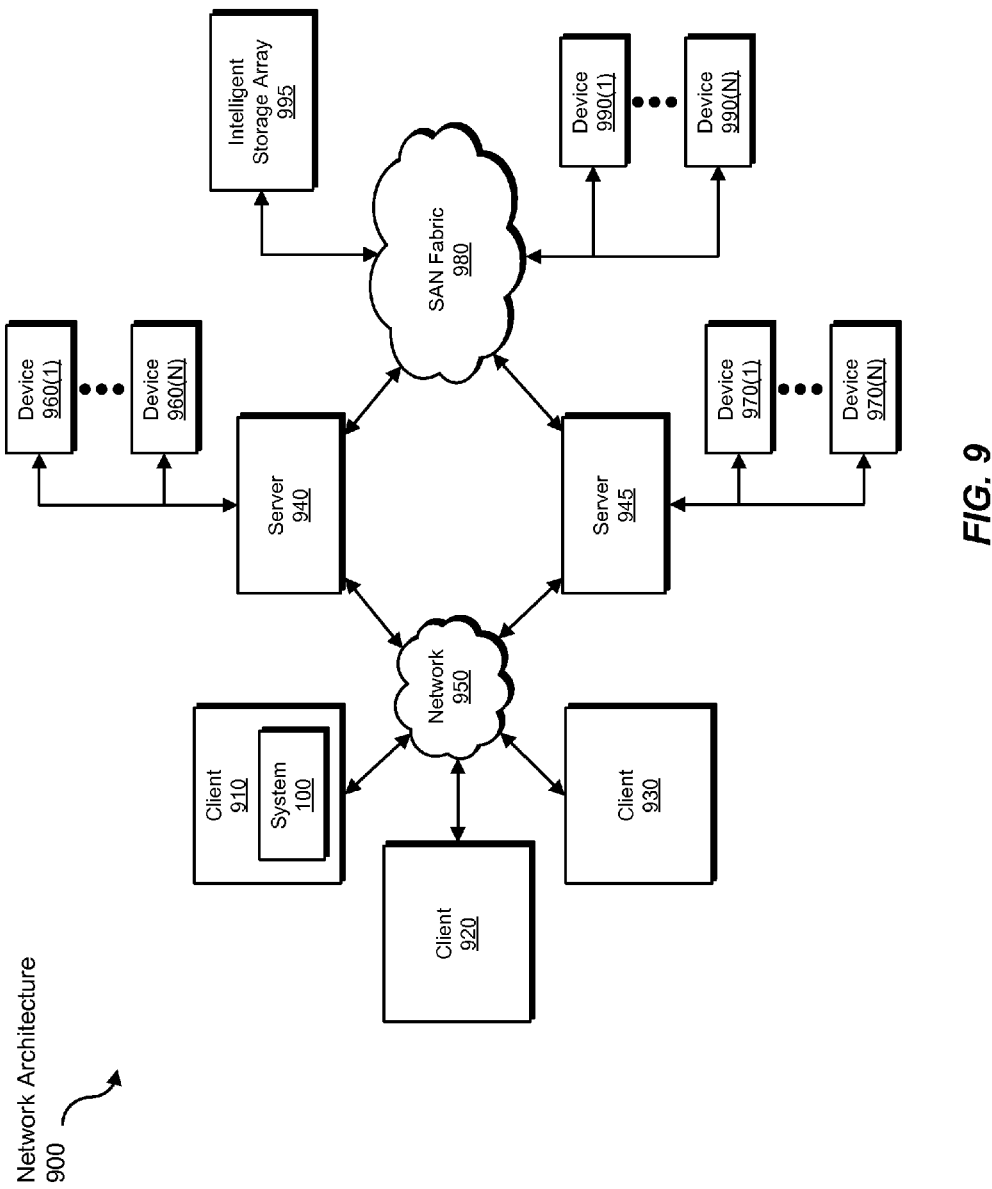

SYSTEMS AND METHODS FOR ANTICIPATING FILE-SECURITY QUERIES

BACKGROUND

Security service providers may maintain a database of information describing the security of files. A user who has downloaded a file, or is considering downloading the file, may query the security service provider to obtain information about the security of the file from the database. It is increasingly common for colossal numbers of users to request a same file or a same set of files within a short period of time. This phenomena may be triggered by a software distributor releasing a new application or a new patch update. In some instances, millions of users may query for an indication of the security of each file included in a new application or patch update within a few hours. Thus, security service providers resort to scaling backend telemetry architecture to handle such staggering spikes in query volume. If the backend telemetry architecture is insufficient, a large spike in query volume may saturate the servers of security service providers such that the servers are unable to respond to new queries. Accordingly, the instant disclosure identifies a need for improved systems and methods for anticipating and responding to spikes in query volume.

SUMMARY

As will be described in greater detail below, the instant disclosure describes various systems and methods for anticipating future queries for information describing the security of one or more files based on a past rate at which client devices have been querying for the file security information. In some examples, the instant disclosure may send file security information with a threshold query rate to client devices that have not yet queried for the file security information. In one example, a computer-implemented method for anticipating file-security queries may include (1) monitoring queries from client devices for information that describes the security of files, (2) determining that a threshold number of the client devices are querying for information describing the security of a file within a threshold amount of time, (3) anticipating, based on the determination, that at least one client device that did not query for the information describing the security of the file will query for the information describing the security of the file, and (4) delivering, in response to anticipating that the client device that did not query for the information describing the security of the file will query for the information describing the security of the file, the information describing the security of the file to the client device that did not query for the information describing the security of the file.

In one embodiment, the computer-implemented method may further include (1) determining that a threshold number of the client devices querying for the information describing the security of the file are also, within the threshold amount of time, querying for information describing the security of an additional file, (2) anticipating, based on the determination that the threshold number of the client devices querying for the information describing the security of the file are also, within the threshold amount of time, querying for the information describing the security of the additional file, that a client device that queried for the information describing the security of the file, but did not query for the information describing the security of the additional file, will query for the information describing the security of the additional file, and (3) in response to anticipating that the client device that queried for the information describing the security of the file, but did not query for the information describing the security of the additional file, will query for the information describing the security of the additional file, delivering the information describing the security of the additional file to the client device that queried for the information describing the security of the file, but did not query for the information describing the security of the additional file.

In some examples, anticipating that the client device that queried for the information describing the security of the file, but did not query for the information describing the security of the additional file, will query for the information describing the security of the additional file may include (1) inferring that the file and the additional file represent files of a same container file and (2) anticipating that the client device that queried for the information describing the security of the file, but did not query for the information describing the security of the additional file, will query for information describing the security of every file included in the container file. In one embodiment, the container file may include (1) a compressed file, (2) an installer file, and/or (3) a patch update.

In some examples, inferring that the file and the additional file represent files of the same container file is based on the threshold number of the client devices querying for the information describing the security of the file also, within the threshold amount of time, querying for the information describing the security of the additional file. Additionally or alternatively, inferring that the file and the additional file represent files of the same container file is based on obtaining an indication by a distributor of the same container file that the same container file may include both the file and the additional file.

In some examples, anticipating that the client device that queried for the information describing the security of the file, but did not query for the information describing the security of the additional file, will query for the information describing the security of the additional file may include (1) inferring that the file acts as a container file for other files including at least the additional file and (2) anticipating that the client device that queried for the information describing the security of the file, but did not query for the information describing the security of the additional file, will query for information describing the security of every file included in the file. In one embodiment, the file may include (1) a compressed file, (2) an installer file, and/or (3) a patch update. In some examples, inferring that the file may act as the container file for the other files, including at least the additional file, is based on the threshold number of the client devices querying for the information describing the security of the file also, within the threshold amount of time, querying for the information describing the security of the additional file. Additionally or alternatively, inferring that the file may act as the container file for the other files including at least the additional file is based on obtaining an indication by a distributor of the file that the file may act as the container file for the additional file.

In some examples, anticipating that the client device that did not query for the information describing the security of the file will query for the information describing the security of the file may include determining that a likelihood that the client device that did not query for the information describing the security of the file will query for the information describing the security of the file exceeds a threshold likelihood.

In one embodiment, monitoring the queries from the client devices for information describing the security of files may include monitoring queries from client deices originating from a specified geographic region. In this embodiment, delivering the information describing the security of the file to the client device that did not query for the information describing the security of the file may include (1) determining that the client device that did not query for the information describing the security of the file is located in the specified geographic region and (2) delivering the information describing the security of the file to the client device that did not query for the information describing the security of the file based on determining that the client device that did not query for the information describing the security of the file is located in the specified geographic region.

In one embodiment, monitoring the queries from the client devices for information describing the security of files may include monitoring queries from client devices including a specified computing device component. In this embodiment, delivering the information describing the security of the file to the client device that did not query for the information describing the security of the file may include (1) determining that the client device that did not query for the information describing the security of the file has the specified computing device component and (2) delivering the information describing the security of the file to the client device that did not query for the information describing the security of the file based on determining that the client device that did not query for the information describing the security of the file has the specified computing device component. In some examples, the specified computing device component may include (1) an operating system, (2) a computer program, and/or (3) a device driver.

In one example, monitoring the queries from the client devices for the information describing the security of files may include monitoring queries from client devices operating in a specified language. In this example, delivering the information describing the security of the file to the client device that did not query for the information describing the security of the file may include (1) determining that the client device that did not query for the information describing the security of the file operates in the specified language and (4) delivering the information describing the security of the file to the client device that did not query for the information describing the security of the file based on determining that the client device operates in the specified language.

In some embodiments, the computer-implemented method may further include, after delivering the information describing the security of the file to the client device that did not query for the information describing the security of the file, (1) determining that the threshold number of client devices querying for the information describing the security of the file has dropped a threshold amount within a subsequent threshold amount of time and, after determining that the threshold number of client devices querying for the information describing the security of the file has dropped the threshold amount within the subsequent threshold amount of time, (2) only delivering the information describing the security of the file to client devices that query for the information describing the security of the file. In some examples, determining that the threshold number of client devices are querying for the information describing the security of the file may include receiving a query for the information describing the security of the file from each client device within the threshold number of client device that includes a hash of the file.

In one embodiment, a system for implementing the above-described method may include (1) a monitoring module, stored in memory, that monitors queries from a multitude of client devices for information that describes the security of files, (2) a determination module, stored in memory, that determines that a threshold number of client devices within the multitude of client devices are querying for information describing the security of a file within a threshold amount of time, (3) an anticipation module, stored in memory, that anticipates, based on the determination, that at least one client device that did not query for the information describing the security of the file will query for the information describing the security of the file, (4) a delivering module, stored in memory, that delivers, in response to anticipating that the client device that did not query for the information describing the security of the file will query for the information describing the security of the file, the information describing the security of the file to the client device that did not query for the information describing the security of the file, and (5) at least one physical processor configured to execute the monitoring module, the determination module, the anticipation module, and the delivering module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor queries from a client devices for information that describes the security of files, (2) determine that a threshold number of client devices within the client devices are querying for information describing the security of a file within a threshold amount of time, (3) anticipate, based on the determination, that at least one client device that did not query for the information describing the security of the file will query for the information describing the security of the file, and (4) deliver, in response to anticipating that the client device that did not query for the information describing the security of the file will query for the information describing the security of the file, the information describing the security of the file to the client device that did not query for the information describing the security of the file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 9 is a block diagram of an exemplary computing network capable of implementing one or more of the embodiments described and/or illustrated herein.

Figure 1:
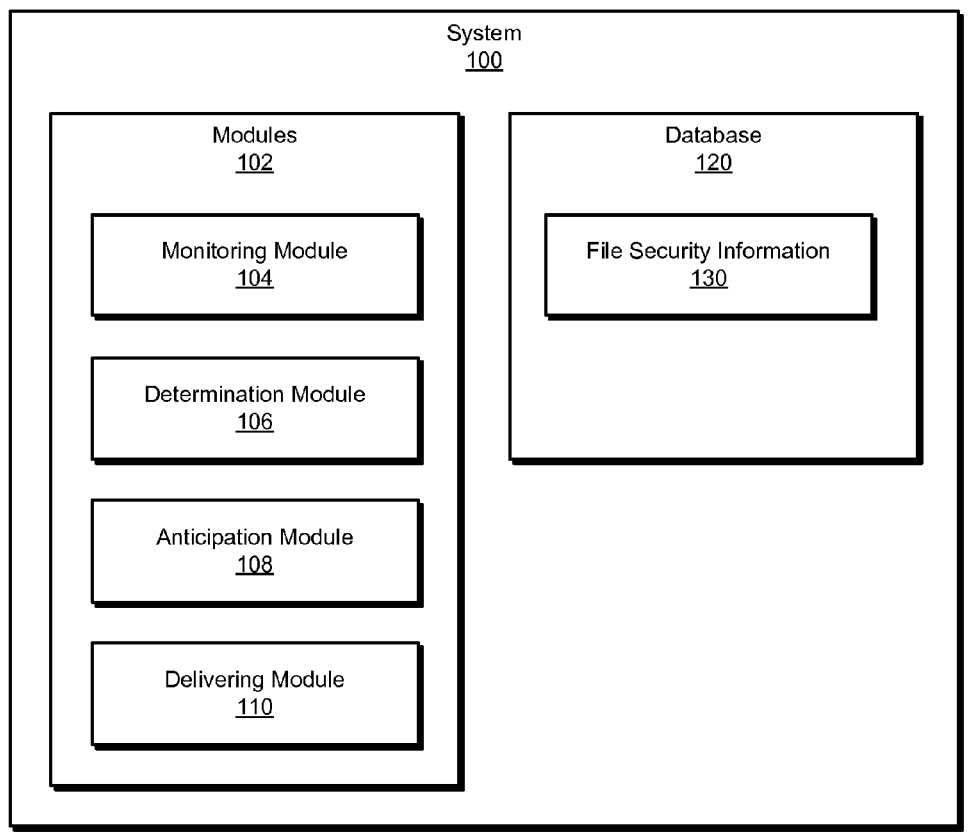
FIG. 1 is a block diagram of an exemplary system for anticipating file-security queries.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for anticipating file-security queries. As will be explained in greater detail below, the systems and methods described herein may leverage real time prevalence query data and historical query patterns to anticipating file-security queries based on the rates at which client devices are querying a server for information relating to the security of files. The systems and methods described herein may then send file security information proactively to client devices that are expected to query for the file security information, but have yet to do so. By delivering file security information to client devices before the client devices have queried for the file security information, embodiments of the instant disclosure may reduce the overall volume of queries to the security server. This reduction in backend queries may be especially beneficial during significant spikes in query volume that may otherwise cause a server resource shortage.

Figure 2:
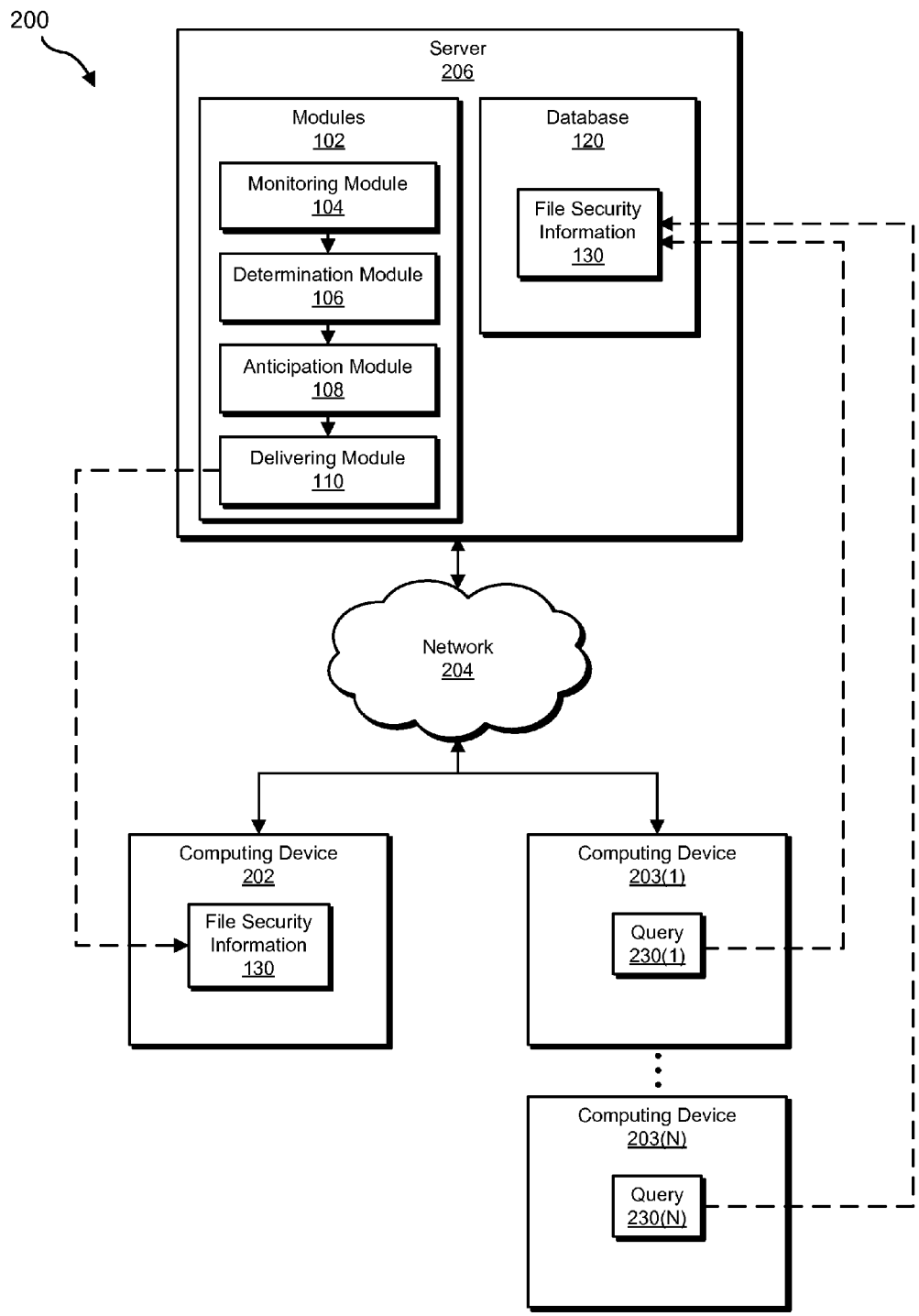
FIG. 2 is a block diagram of an additional exemplary system for anticipating file-security queries.

The following will provide, with reference to FIGS. 1-2, detailed descriptions of exemplary systems for anticipating file-security queries. Detailed descriptions of corresponding computer-implemented methods will also be provided in connection with FIGS. 3-7. In addition, detailed descriptions of an exemplary computing system and network architecture capable of implementing one or more of the embodiments described herein will be provided in connection with FIGS. 8 and 9, respectively.

FIG. 1 is a block diagram of exemplary system 100 for anticipating file-security queries. As illustrated in this figure, exemplary system 100 may include one or more modules 102 for performing one or more tasks. For example, and as will be explained in greater detail below, exemplary system 100 may also include a monitoring module 104 that may monitor queries from a plurality of client devices for information that describes the security of files. Exemplary system 100 may additionally include a determination module 106 that may determine that a threshold number of client devices within the plurality of client devices are querying for information describing the security of a file within a threshold amount of time. Exemplary system 100 may also include an anticipation module 108 that may anticipate, based on the determination, that at least one client device that did not query for the information describing the security of the file will query for the information describing the security of the file. Exemplary system 100 may additionally include a delivering module 110 that may deliver, in response to anticipating that the client device that did not query for the information describing the security of the file will query for the information describing the security of the file, the information describing the security of the file to the client device that did not query for the information describing the security of the file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, computing devices 203(1)-(N), and/or server 206), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store file security information 130. Database 120 may represent portions of a single database or computing device or a plurality of databases or computing devices. For example, database 120 may represent a portion of server 206 in FIG. 2, computing system 810 in FIG. 8, and/or portions of exemplary network architecture 900 in FIG. 9. Alternatively, database 120 in FIG. 1 may represent one or more physically separate devices capable of being accessed by a computing device, such as server 206 in FIG. 2, computing system 810 in FIG. 8, and/or portions of exemplary network architecture 900 in FIG. 9.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. System 200 may also include computing devices 203(1)-(N) in communication with server 206 via network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. Additionally or alternatively, computing devices 203(1)-(N) may be programmed with one or more of modules 102 and/or may store all or a portion of the data in database 120.

In one embodiment, one or more of modules 102 from FIG. 1 may, when executed by at least one processor of computing device 202, computing devices 203(1)-(N), and/or server 206, enable computing device 202, computing devices 203(1)-(N), and/or server 206 to anticipate file-security queries. For example, and as will be described in greater detail below, monitoring module 104 may monitor queries 230(1)-(N) from computing devices 203(1)-(N) to server 206 for file security information 130. Determination module 106 may determine that a number of computing devices included in computing devices 203(1)-(N) satisfies a threshold number and that computing devices 203(1)-(N) are querying for file security information 130 within a threshold amount of time. Anticipation module 108 may anticipate, based on the determination, that at least one client device, such as computing device 202, that did not query for file security information 130 will query for file security information 130. Delivering module 110 may deliver, in response to anticipating that computing device 202 will query for file security information 130, file security information 130 to computing device 202.

Computing device 202 and computing devices 203(1)-(N) generally represent any type or form of computing device capable of reading computer-executable instructions. Examples of computing device 202 and computing devices 203(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 810 in FIG. 8, or any other suitable computing device.

Server 206 generally represents any type or form of computing device that is capable of anticipating queries for information describing the security of files and/or delivering information describing the security of files. Examples of server 206 include, without limitation, application servers and database servers configured to provide various database services and/or run certain software applications. In some examples, server 206 may be associated with a security vendor and anticipate queries for information describing the security of files from clients of the security vendor.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 900 in FIG. 9, or the like. Network 204 may facilitate communication or data transfer using wireless or wired connections. In one embodiment, network 204 may facilitate communication between computing device 202 and server 206. Additionally or alternatively, network 204 may facilitate communication between computing devices 203(1)-(N) and server 206.

Figure 3:
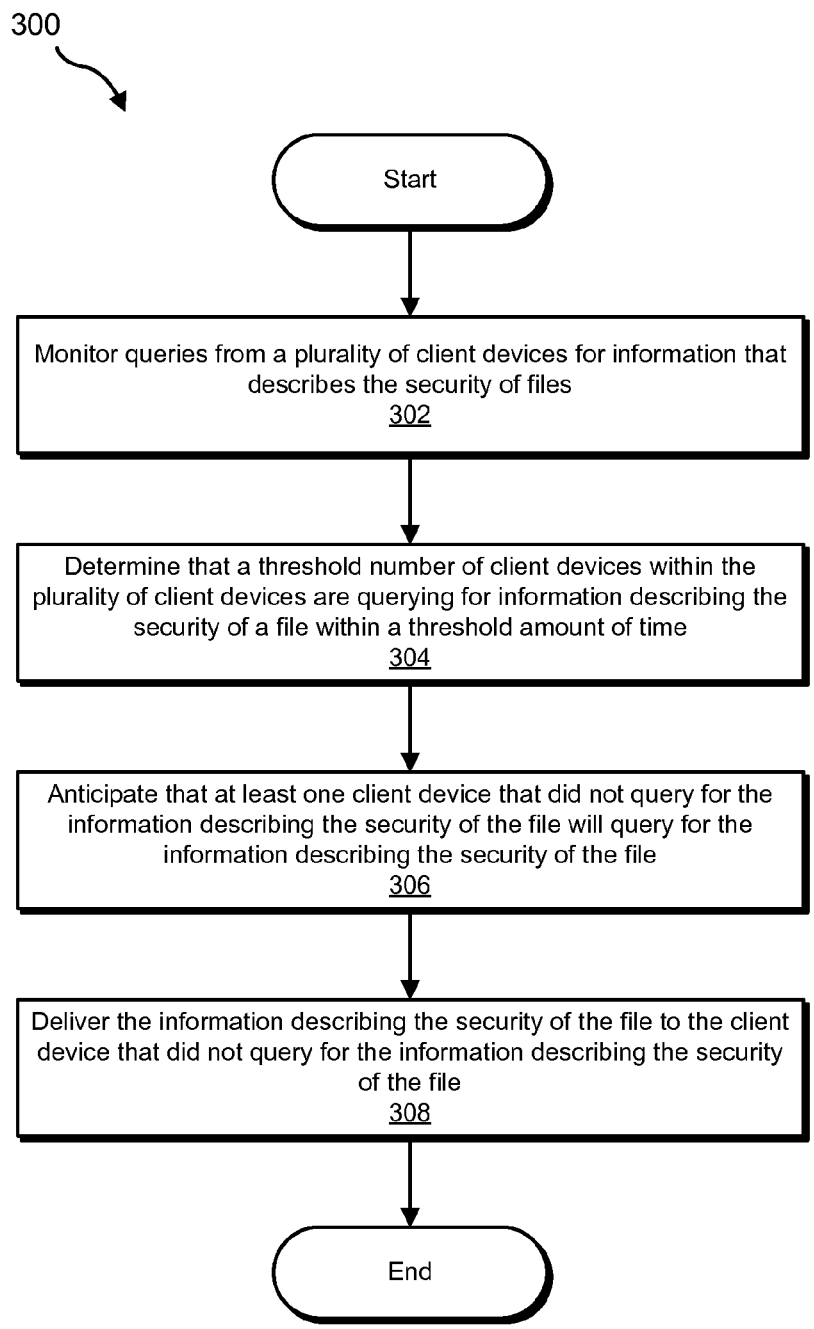
FIG. 3 is a flow diagram of an exemplary method for anticipating file-security queries.

FIG. 3 is a flow diagram of an exemplary computer-implemented method 300 for anticipating file-security queries. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302, one or more of the systems described herein may monitor queries from a plurality of client devices for information that describes the security of files. For example, monitoring module 104 may, as part of server 206 in FIG. 2, monitor queries 230(1)-(N) from computing devices 203(1)-(N) for file security information 130. As used herein, the phrase "information describing the security of a file" refers to any indicator of the safety and/or reputation of a file. In some examples, this information may include a security categorization, such as "Very Safe," "Unsafe," "Unknown," "Trusted," or "High Risk." Additionally or alternatively, this information may include a security score and/or confidence rating. Additionally or alternatively, this information may delineate characteristics of the file that contribute to file security. For example, the information may delineate that the file has been digitally signed or that the file has previously been associated with malicious content. In some examples, the information may include statistics about the file, such as the number of clients who have installed a copy of the file. Additionally or alternatively, the information may include a recommendation. For example, the information may instruct a security system and/or a user to delete and/or quarantine a file.

Monitoring module 104 may monitor queries from computing devices 203(1)-(N) for file security information 130 in a variety of ways. In some examples, monitoring module 104 may operate as part of a security service provider and monitor queries received by a server, such as server 206, of the security vendor. In these examples, computing devices 203(1)-(N) may subscribe to a service of server 206 and may query for file security information as part of the service.

In some examples, monitoring module 104 may monitor all queries received by server 206 for file security information. Additionally or alternatively, monitoring module 104 may group queries based on a characteristic of the computing devices submitting the queries and monitor queries according to group. For example, monitoring module 104 may monitor queries originating from client devices located in a specified geographic region. To illustrate, computing devices 203(1)-(N) may be located in South Korea and monitoring module 104 may monitor the queries originating from computing devices 203(1)-(N) based on computing devices 203(1)-(N) being located in South Korea. As another example, monitoring module 104 may monitor queries from client devices that utilize a specified computing device component. To illustrate, computing devices 203(1)-(N) may utilize a particular operating system, computer program, and/or device driver and monitoring module 104 may monitor the queries originating from computing devices 203(1)-(N) based on computing devices 203(1)-(N) utilizing the particular operating system, computer program, and/or device driver. As another example, monitoring module 104 may monitor queries from client devices operating in a specified language. To illustrate, computing devices 203(1)-(N) may operate in Portuguese and monitoring module 104 may monitor the queries originating from computing devices 203(1)-(N) based on computing devices 203(1)-(N) operating in Portuguese. As will be described in greater detail below, monitoring queries by group may facilitate predicting that certain computing devices will query for certain file security information.

At step 304, one or more of the systems described herein may determine that a threshold number of client devices within the plurality of client devices are querying for information describing the security of a file within a threshold amount of time. For example, determination module 106 may, as part of server 206 in FIG. 2, determine that computing devices 203(1)-(N) have sent queries 230(1)-(N) for file security information 130 and that the number of computing devices included in computing devices 203(1)-(N) exceeds a threshold number. Determination module 106 may further determine that computing devices 203(1)-(N) have sent queries 230(1)-(N) for file security information 130 within a threshold amount of time.

Figure 4:
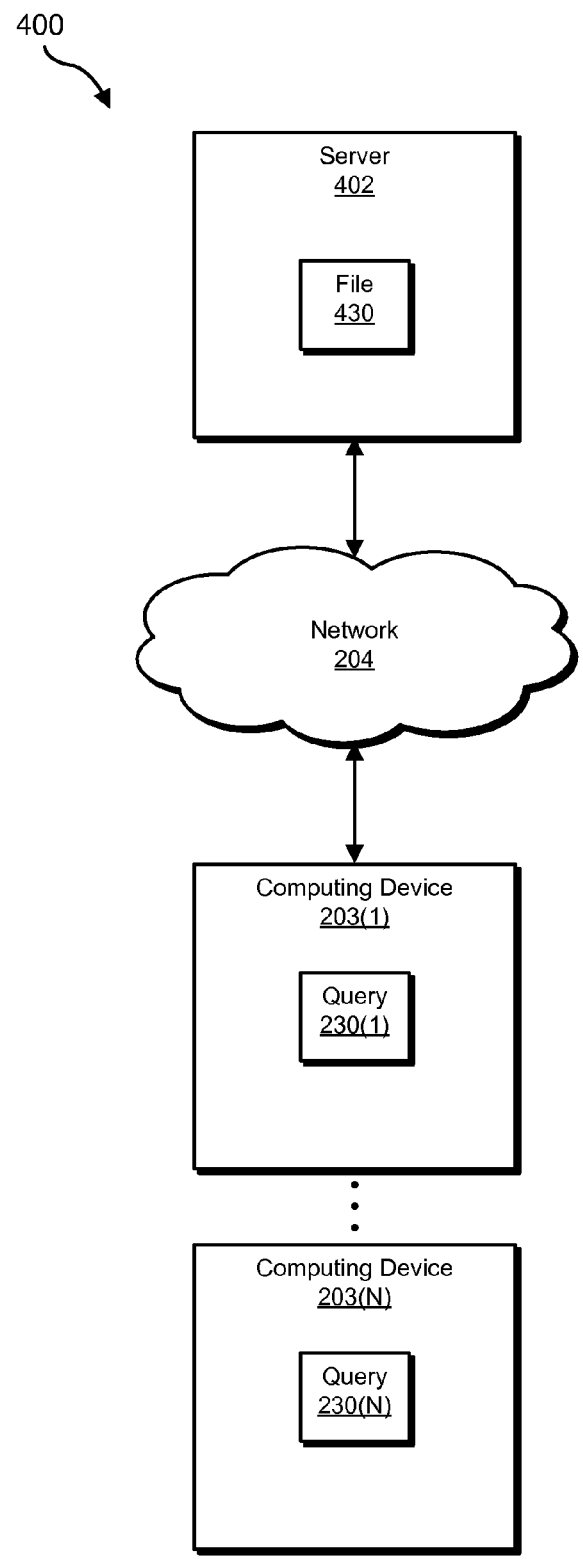
FIG. 4 is a block diagram of an exemplary computing system that has queried for information describing the security of an exemplary file and an exemplary server distributing the exemplary file.

As illustrated in FIG. 4, file security information 130 may describe the security of a file. As shown in FIG. 4, security information 130 may describe a file 430 stored on a server 402. In these examples, computing devices 203(1)-(N) may have downloaded, installed, and/or accessed file 430 from server 402. Additionally or alternatively, users of computing devices 203(1)-(N) may be considering downloading, installing, and/or accessing file 430 from server 402. In some examples, server 402 may be a distributor of file 430.

In some examples, computing devices 203(1)-(N) may query server 206 for file security information 130 in response to downloading, installing, and/or accessing file 430. Additionally or alternatively, computing devices 203(1)-(N) may query server 206 for file security information 130 in response to the users of computing devices 203(1)-(N) contemplating the downloading, installing, and/or accessing of file 430. In some examples, queries 230(1)-(N) may include a hash of file 430. In these examples, determination module 106 may determine that the threshold number of client devices are querying for file security information 130 due to a threshold number of client devices sending queries to server 206 that include a hash of file 430.

Determination module 106 may determine that the threshold number of client devices are querying for the information describing the security of the file in a variety of ways. For example, determination module 106 may determine that the number of computing devices represented in computing devices 203(1)-(N) that have queried for file security information 130 exceeds a static number. In these examples, the static number may be designated by the security vendor. Additionally or alternatively, the threshold number may be based on a result of a statistical analysis applied to previous file query patterns and/or an adaptive algorithm being applied continuously to queries for file security information 130.

In some embodiments, the threshold number may be a number relative to a threshold length of time. For example, determination module 106 may determine that the threshold number of client devices querying for a file is ten thousand client devices querying for a file within a threshold time period of two minutes. In this example, determination module 106 may determine that the threshold number of client devices are querying for file security information 130 within the threshold amount of time when computing devices 203(1)-(N) include at least ten thousand computing devices and when queries 230(1)-203(N) are dispensed from the at least ten thousand computing devices within at most two minutes.

In some embodiments, the threshold number and the threshold length of time may be any number and length of time that satisfy a threshold rate. In these examples, determination module 106 may determine that the threshold number of client devices are querying for file security information 130 within the threshold amount of time when computing devices 203(1)-(N) are dispensing queries 230(1)-203(N) at the threshold rate. For example, determination module 106 may determine that the threshold rate is five thousand queries for information describing the security of a given file per second. In this example, determination module 106 may determine that the threshold number of client devices are querying for file security information 130 within the threshold amount of time if determination module 106 determines that, within ten seconds, at least fifty thousand client devices queried for file security information 130. Similarly, in this example, determination module 106 may determine that the threshold number of client devices are querying for file security information 130 within the threshold amount of time if determination module 106 determines that, within one minute, at least three hundred thousand client devices queried for file security information 130. In some embodiments, determination module 106 may additionally identify client devices that have not queried for file security information 130. For example, determination module 106 may determine that computing device 202 has not queried for file security information 130.

Figure 5:
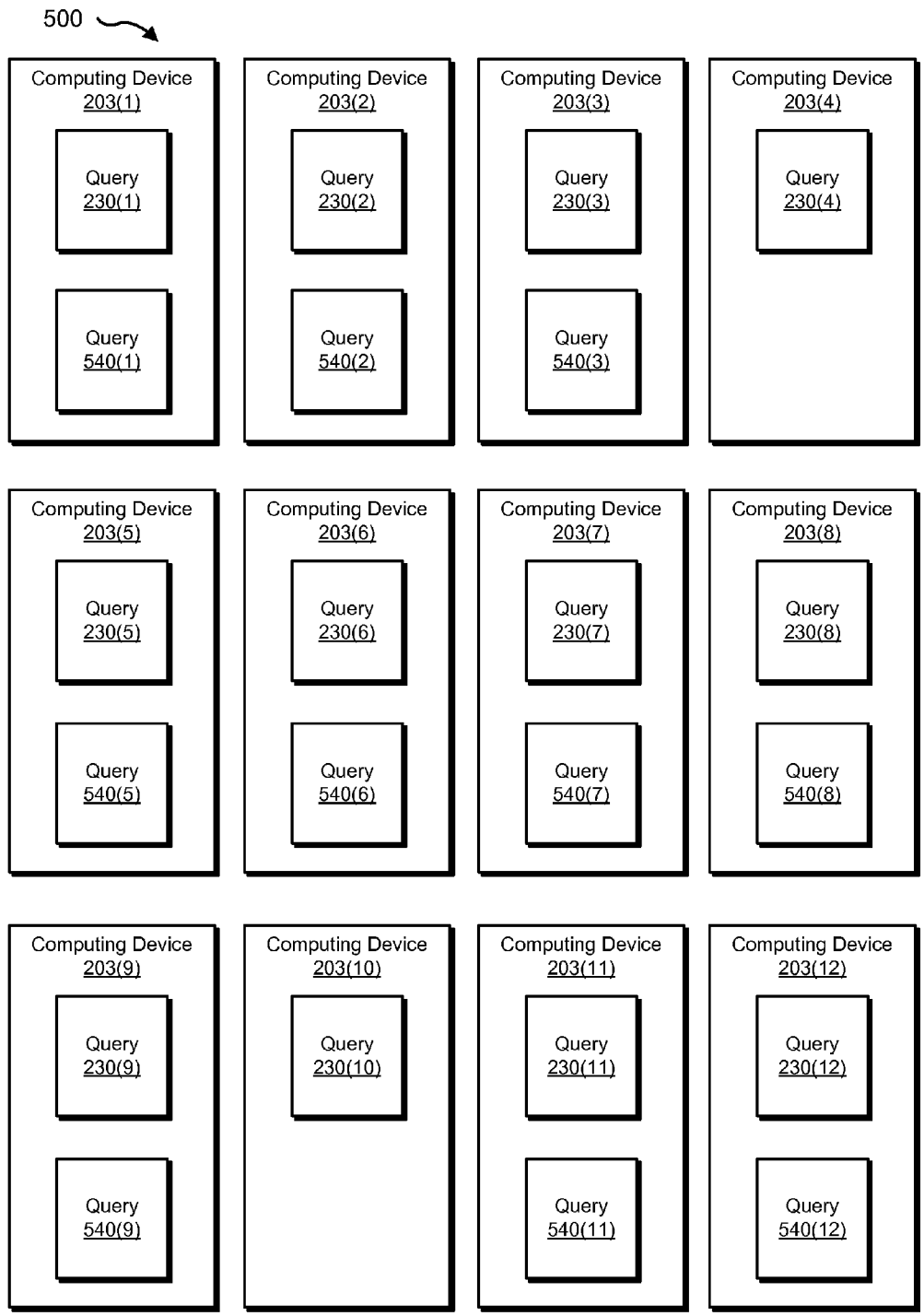
FIG. 5 is a block diagram of exemplary computing devices querying for information describing the security of files.
Figure 6:
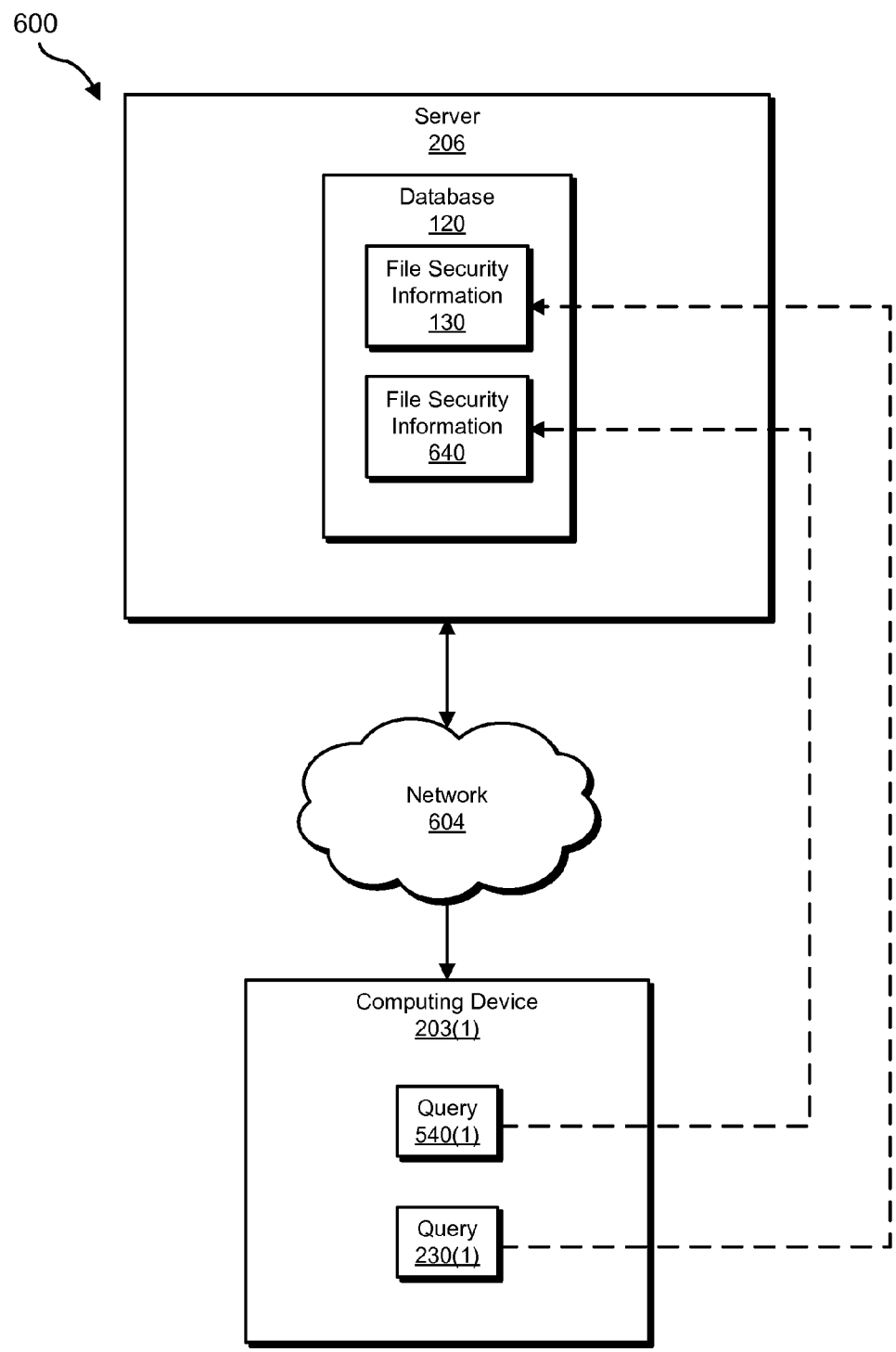
FIG. 6 is a block diagram of an additional exemplary system for anticipating file-security queries.
Figure 7:
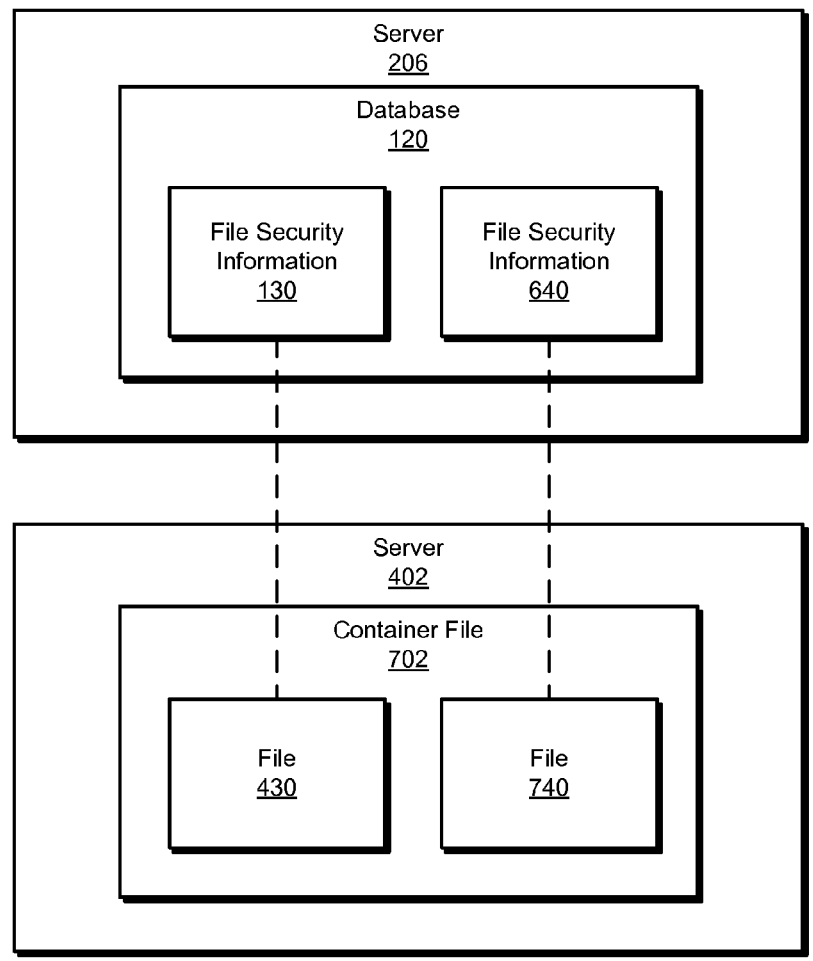
FIG. 7 is a block diagram of an exemplary container file.

In some embodiments, determination module 106 may determine that a threshold number of computing devices 203(1)-203(N) are also, within the threshold amount of time, querying for information describing the security of an additional file. For example, as illustrated in FIG. 5, determination module 106 may determine that a computing device 203(1) has, in addition to sending a query 230(1), sent a query 540(1). As illustrated in FIG. 6, query 230(1) may be a query for file security information 130 and query 540(1) may be a query for file security information 640. In this example, file security information 640 may describe the security of an additional file. For example, as illustrated in FIG. 7, file security information 640 may describe the security of a file 740. Returning to FIG. 5, determination module 106 may similarly determine that a computing device 203(2) has, in addition to sending a query 230(2), sent a query 540(2) for file security information 640, a computing device 203(3) has, in addition to sending a query 230(3), sent a query 540(3) for file security information 640, a computing device 203(5) has, in addition to sending a query 230(5), sent a query 540(5) for file security information 640, a computing device 203(6) has, in addition to sending a query 230(6), sent a query 540(6) for file security information 640, a computing device 203(7) has, in addition to sending a query 230(7), sent a query 540(7) for file security information 640, a computing device 203(8) has, in addition to sending a query 230(8), sent a query 540(8) for file security information 640, a computing device 203(9) has, in addition to sending a query 230(9), sent a query 540(9) for file security information 640, a computing device 203(11) has, in addition to sending a query 230(11), sent a query 540(11) for file security information 640, and a computing device 203(12) has, in addition to sending a query 230(12), sent a query 540(12) for file security information 640. Determination module 106 may also determine that a computing device 203(4) has sent only a query 230(4) and that a computing device 203(1) has sent only a query 230(10). As such, determination module 106 may determine that 80% of computing devices 203(1)-(12) that queried for file security information 130 also queried for file security information 640.

Returning to step 304, in some embodiments, determination module 106 may generate file security information 130 in response to determining that the threshold number of client devices are querying for file security information 130. In these embodiments, determination module 106 may generate file security information 130 automatically and/or prompt a user for manual analysis.

In some examples, the threshold number of computing devices to also query for information describing the security of an additional file may be a static number. For example, the threshold number may be seven. In this example, determination module 106 may determine that the number of computing devices 203(1)-(12) to query for file security information 640 in addition to querying for file security information 130 exceeds the threshold number because more than seven of computing devices 203(1)-(12) queried for file security information 640 in addition to querying for file security information 130. Additionally or alternatively, the threshold number of computing devices to also query for information describing the security of an additional file may be a percentage of the computing devices that queried for information describing the security of the file. For example, the threshold number may be 80%. In this example, determination module 106 may determine that the percentage of computing devices 203(1)-(12) to query for file security information 640 in addition to querying for file security information 130 exceeds the threshold percentage because 80% of computing devices 203(1)-(12) queried for file security information 640 in addition to querying for file security information 130. In some examples, the threshold number may be based on a result of a statistical analysis applied to previous file query patterns and/or the query patterns for file security information 130 and file security information 640.

At step 306, one or more of the systems described herein may anticipate, based on the determination made in step 304, that at least one client device that did not query for the information describing the security of the file will query for the information describing the security of the file. For example, anticipation module 108 may, as part of server 206 in FIG. 2, anticipate, based on the determination made in step 304, that computing device 202 will query for file security information 130.

Anticipation module 108 may perform step 306 in any suitable manner. In some embodiments, anticipation module 108 may determine a likelihood that computing device 202 will query for file security information 130. Anticipation module 108 may determine the likelihood that computing device 202 will query for file security information 130 in a variety of ways. In one example, anticipation module 108 may determine the likelihood based on a percentage of the plurality of monitored client devices that have queried for file security information 130. For example, anticipation module 108 may determine that sixty percent of the client devices monitored as part of step 302 have queried for file security information 130. In this example, anticipation module 108 may determine that computing device 202 has a sixty percent likelihood of querying for file security information 130.

In some embodiments, anticipation module 108 may determine the likelihood that computing device 202 will query for file security information 130 based at least in part on a change in query rate for file security information 130 overtime. For example, anticipation module 108 may determine that (1) during an initial hour, one percent of the plurality of monitored client devices queried for file security information 130, (2) during a second hour, an additional two percent of the plurality of monitored client devices queried for file security information 130, (3) during a third hour, an additional four percent of the plurality of monitored client devices queried for file security information 130, and (4) during a fourth hour, an additional eight percent of the plurality of monitored client devices queried for file security information 130. In this example, anticipation module 108 may determine, based on the queries for file security information 130 doubling every hour, that computing device 202 has a sixteen percent likelihood of querying for file security information 130 during a fifth hour.

In some examples, anticipation module 108 may determine the likelihood that computing device 202 will query for file security information 130 based at least in part on query patterns of client devices with characteristics that match a characteristic of computing device 202. For example, anticipation module 108 may determine that computing device 202 operates in Portuguese. In this example, determination module 106 may have determined that only two percent of all client devices monitored in step 302 are querying for file security information 130 within the threshold amount of time. However, determination module 106 may have also determined that seventy-five percent of the monitored client devices that operate in Portuguese are querying for file security information 130. As such, anticipation module 108 may determine that computing device 202 has a seventy-five percent likelihood of querying for file security information 130 due to seventy-five percent of computing devices with a matching characteristic having queried for file security information 130. In some instances, anticipation module 108 may determine the likelihood that computing device 202 will query for file security information 130 based at least in part on historical query patterns and/or ongoing query patterns.

In embodiments where anticipation module 108 determines the likelihood that computing device 202 will query for file security information 130, anticipation module 108 may anticipate that computing device 202 will query for file security information 130 by determining that the determined likelihood exceeds a threshold likelihood. In some examples, the threshold likelihood may be a designated by a security vendor utilizing server 206. Additionally or alternatively, the threshold likelihood may be based on input received from a user of computing device 202 describing a level of general interest the user has in receiving file security information.

In some embodiments, as discussed above in connection with step 304, a threshold number of computing devices 203(1)-(N) querying for file security information 130 may also query for file security information 640 describing the security of file 740. In these embodiments, anticipation module 108 may, based on the threshold number of computing devices 203(1)-(N) querying for both file security information 130 and file security information 640, additionally anticipate that a computing device, such as computing device 203(4) and/or computing device 203(10) in FIG. 5, that has sent query 230(4) for file security information 130, but has not sent a query for file security information 640, will query for file security information 640.

In some examples, as illustrated in FIG. 7, file 430 and file 740 may be files of a same container file 702. As used herein, the term "container file" refers generally to any file that acts as a container to at least one other file. Examples of a container file may include, without limitation, a compressed file, an installer file, and/or a patch update. As shown in FIG. 7, file security information 130 and file security 640 may be maintained by a server 206. File security information 130 may describe the security of file 430 and file security information 630 may describe the security of file 740. Both file 430 and file 740 may be maintained by server 402. As illustrated in FIG. 7, container file 702 may act as a container to both file 430 and file 740. In other examples, file 430 may act as a container file for file 740. In some examples, anticipation module 108 may infer that file 430 and file 740 are part of a same container file 702, or that file 430 acts as a container to file 740. In these examples, anticipation module 108 may anticipate that a client device, such as computing device 203(4), which has queried for file security information 130 but has not queried for file security information 640, will query for every file included in the container file.

Anticipation module 108 may infer that file 430 and file 740 are part of the same container file 702, or that file 430 acts as a container to file 740 in a variety of ways, as illustrated in FIG. 7. For example, anticipation module 108 may determine that above a threshold number and/or percentage of the client devices querying for file security information 130 are, at substantially the same time, also querying for file security information 640. In this example, anticipation module 108 may infer that file 430 and file 740 are part of a same container file 702, or that file 430 acts as a container to file 740, based on the threshold number of client devices querying for file security information 130, which describes the security of file 430, also querying for file security information 640, which describes the security of file 740. Additionally or alternatively, a distributor of file 430 and file 740 may indicate that that file 430 and file 740 are part of a same container file 702, or that file 430 acts as a container to file 740. After receiving the indication, server 206 may store data about the relationship between file 430 and file 740. For example, anticipation module 108 may infer that file 430 and file 740 are part of a same container file 702, or that file 430 acts as a container to file 740, based on the indication from the distributor, and may store information about this relationship in database 120.

At step 308, one or more of the systems described herein may deliver, in response to anticipating that the client device that did not query for the information describing the security of the file will query for the information describing the security of the file, the information describing the security of the file to the client device that did not query for the information describing the security of the file. For example, delivering module 110 may, as part of server 206 in FIG. 2, deliver, in response to anticipating that computing device 202 will query for file security information 130, file security information 130 to computing device 202.

Delivering module 110 may deliver file security information 130 to computing device 202 in a variety of ways. In some embodiments, delivering module 110 may deliver file security information 130 offline to a cache of computing device 202. In some instances, delivering module 110 may deliver file security information 130 to computing device 202 by including file security information 130 in an automatic security update that is sent to computing device 202 at scheduled intervals without requiring input from computing device 202.

In some examples, delivering module 110 may deliver file security information 130 to computing device 202 based on a characteristic of computing device 202. For example, as discussed above in connection with step 302, monitoring module 104 may monitor queries originating from a specified geographic region. In this example, delivering module 110 may determine that computing device 202 is located in the specified geographic region. Based at least in part on this determination, delivering module 110 may deliver file security information 130 to computing device 202. Similarly, as discussed above in connection with step 302, monitoring module 104 may have monitored queries from client devices that utilize a specified device component. In this example, delivering module 110 may determine that computing device 202 utilizes the specified device component. Based at least in part on this determination, delivering module 110 may deliver file security information 130 to computing device 202.

Additionally or alternatively, as described above in connection with step 302, monitoring module 104 may have monitored queries from client devices that operate in a specified language. In this example, delivering module 110 may determine that computing device 202 operates in the specified language. Based at least in part on this determination, delivering module 110 may deliver file security information 130 to computing device 202. In some examples, delivering module 110 may deliver file security information 130 to every customer of a security service associated with server 206 based on the determination that the threshold number of client devices are querying for file security information 130 within the threshold amount of time. In these examples, delivering module 110 may determine that computing device 202 is a customer of the security service. Based at least in part on this determination, delivering module 110 may deliver file security information 130 to computing device 202.

In some embodiments, as discussed above in connection with step 306, anticipation module 108 may have anticipated that computing device 203(4) and/or computing device 203(10), which had sent queries for file security information 130, but had not sent a query for file security information 640, will query for file security information 640. In these embodiments, delivering module 110 may, in response to anticipation module 108 anticipating that computing device 203(4) and/or computing device 203(10) will query for file security information 640, deliver file security information 640 to computing device 203(4) and/or computing device 203(10).

In some embodiments, as discussed above in connection with step 306, anticipation module 108 may anticipate that a client device, such as computing device 203(4) and/or computing device 203(10), which has queried for file security information 130, will query for file security information for every file included in a container file that acts as a container to file 430. In these embodiments, delivering module 110 may, in response to anticipation module 108 anticipating that computing device 203(4) and/or computing device 203(10) will query for file security information for every file included in the container file, deliver file security information for every file contained by the container file. Thus, computing device 203(4) and/or computing device 203(10) may send server 206 a query for security information for a single file but receive, in response, security information for a plurality of files.

In some embodiments, after delivering module 110 has delivered file security information 130 to computing device 202, determination module 106 may determine that the number of client devices querying for file security information 130 has dropped a threshold amount within a subsequent threshold amount of time. In response, delivering module 110 may, after the subsequent amount of time, only deliver file security information 130 to client devices that query for file security information 130.

As detailed above, by analyzing the rate at which client devices are querying for information describing the security of files, the systems and methods described herein may predict, based on the query rate, that client devices will query for the file security information before the client devices actually query for the file security information. The systems and methods described herein may then send file security information to the client devices that have not queried for the file security information. By delivering file security information to client devices before the client devices have queried for the security information, embodiments of the instant disclosure may reduce a query load on the security server during spikes in query volume. This may, in turn, prevent potential security server shortages and expedite delivery of file security information to client devices.

Figure 8:
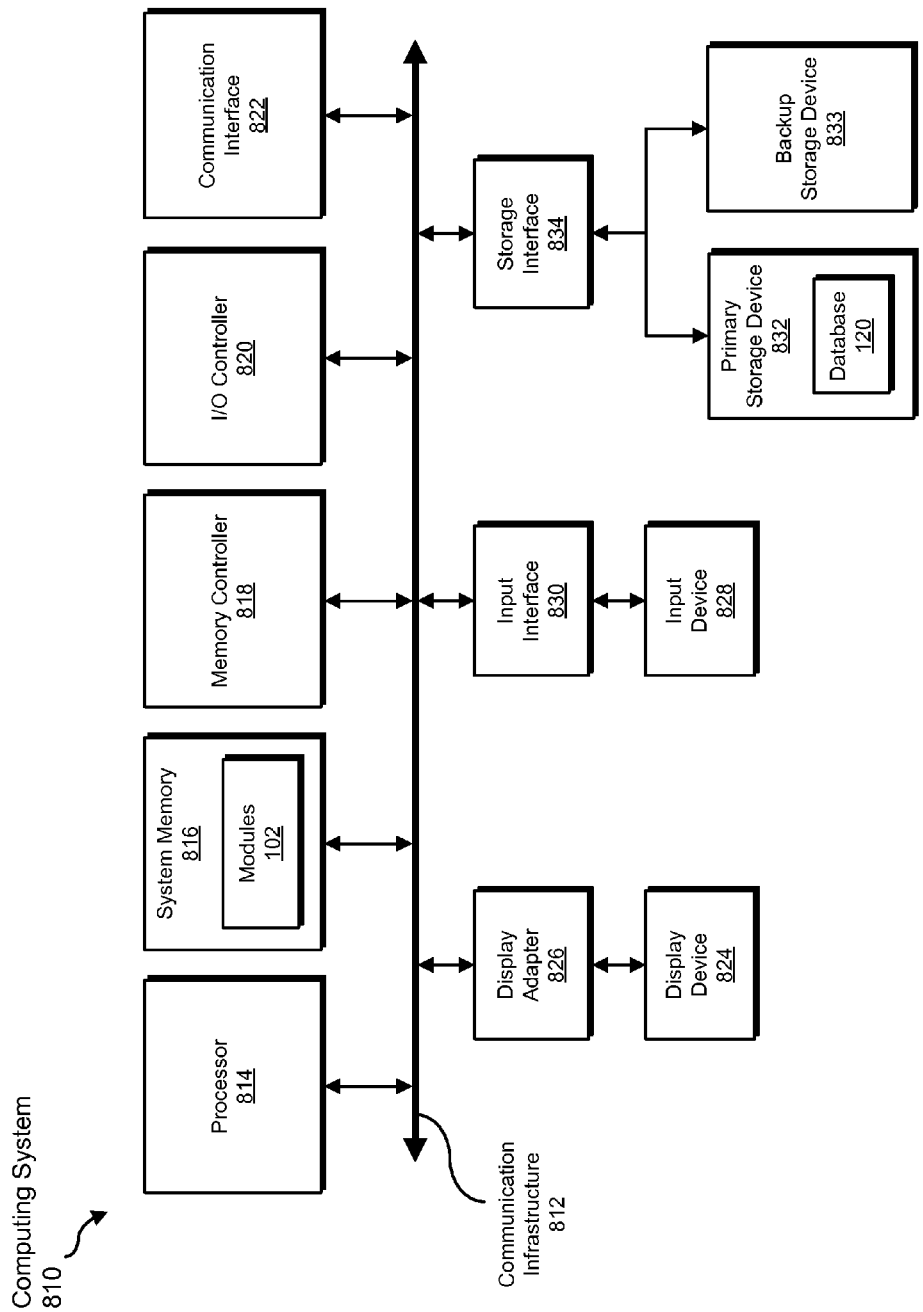
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, database 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for anticipating file-security queries.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive query rates for information describing the security of a file, and transform the query rates into determination to deliver the information describing the security of the file to computing devices that have not queried for the information describing the security of the file. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for anticipating file-security queries, at least a portion of the method being performed by a computing device comprising at least one processor, the method comprising:
    monitoring queries from a plurality of client devices for information that describes the security of files;
    determining that a threshold number of client devices within the plurality of client devices are querying for information describing the security of a file within a threshold amount of time;
    anticipating, based on the determination, that at least one client device that did not query for the information describing the security of the file will query for the information describing the security of the file;
    delivering, in response to anticipating that the client device that did not query for the information describing the security of the file will query for the information describing the security of the file, the information describing the security of the file to the client device that did not query for the information describing the security of the file.

2. The computer-implemented method of claim 1, further comprising:
    determining that a threshold number of the client devices querying for the information describing the security of the file are also, within the threshold amount of time, querying for information describing the security of an additional file;
    anticipating, based on the determination that the threshold number of the client devices querying for the information describing the security of the file are also, within the threshold amount of time, querying for the information describing the security of the additional file, that a client device that queried for the information describing the security of the file, but did not query for the information describing the security of the additional file, will query for the information describing the security of the additional file;
    in response to anticipating that the client device that queried for the information describing the security of the file, but did not query for the information describing the security of the additional file, will query for the information describing the security of the additional file, delivering the information describing the security of the additional file to the client device that queried for the information describing the security of the file, but did not query for the information describing the security of the additional file.

3. The computer-implemented method of claim 2, wherein anticipating that the client device that queried for the information describing the security of the file, but did not query for the information describing the security of the additional file, will query for the information describing the security of the additional file comprises:
    inferring that the file and the additional file comprise files of a same container file that acts as a container for a plurality of files comprising at least the file and the additional file;
    anticipating that the client device that queried for the information describing the security of the file, but did not query for the information describing the security of the additional file, will query for information describing the security of every file included in the container file.

4. The computer-implemented method of claim 3, wherein the container file comprises at least one of:
    a compressed file;
    an installer file;
    a patch update.

5. The computer-implemented method of claim 3, wherein inferring that the file and the additional file comprise files of the same container file is based on at least one of:
    the threshold number of the client devices querying for the information describing the security of the file also, within the threshold amount of time, querying for the information describing the security of the additional file;
    obtaining an indication by a distributor of the same container file that the same container file comprises both the file and the additional file.

6. The computer-implemented method of claim 2, wherein anticipating that the client device that queried for the information describing the security of the file, but did not query for the information describing the security of the additional file, will query for the information describing the security of the additional file comprises:
    inferring that the file acts as a container file for a plurality of files comprising at least the additional file;

anticipating that the client device that queried for the information describing the security of the file, but did not query for the information describing the security of the additional file, will query for information describing the security of every file included in the file.

7. The computer-implemented method of claim 6, wherein the file comprises at least one of:
   a compressed file;
   an installer file;
   a patch update.

8. The computer-implemented method of claim 6, wherein inferring that the file comprises the container file that acts as the container for the plurality of files comprising at least the additional file is based on at least one of:
   the threshold number of the client devices querying for the information describing the security of the file also, within the threshold amount of time, querying for the information describing the security of the additional file;
   obtaining an indication by a distributor of the file that the file comprises the container file for the additional file.

9. The computer-implemented method of claim 1, wherein anticipating that the client device that did not query for the information describing the security of the file will query for the information describing the security of the file comprises determining that a likelihood that the client device that did not query for the information describing the security of the file will query for the information describing the security of the file exceeds a threshold likelihood.

10. The computer-implemented method of claim 1, wherein:
    monitoring the queries from the plurality of client devices for information describing the security of files comprises monitoring queries from client deices originating from a specified geographic region;
    delivering the information describing the security of the file to the client device that did not query for the information describing the security of the file comprises:
    determining that the client device that did not query for the information describing the security of the file is located in the specified geographic region;
    delivering the information describing the security of the file to the client device that did not query for the information describing the security of the file based on determining that the client device that did not query for the information describing the security of the file is located in the specified geographic region.

11. The computer-implemented method of claim 1, wherein:
    monitoring the queries from the plurality of client devices for information describing the security of files comprises monitoring queries from client devices comprising a specified computing device component;
    delivering the information describing the security of the file to the client device that did not query for the information describing the security of the file comprises:
    determining that the client device that did not query for the information describing the security of the file comprises the specified computing device component;
    delivering the information describing the security of the file to the client device that did not query for the information describing the security of the file based on determining that the client device that did not query for the information describing the security of the file comprises the specified computing device component.

12. The computer-implemented method of claim 11, wherein the specified computing device component comprises at least one of:
    an operating system;
    a computer program;
    a device driver.

13. The computer-implemented method of claim 1, wherein:
    monitoring the queries from the plurality of client devices for the information describing the security of files comprises monitoring queries from client devices operating in a specified language;
    delivering the information describing the security of the file to the client device that did not query for the information describing the security of the file comprises:
    determining that the client device that did not query for the information describing the security of the file operates in the specified language;
    delivering the information describing the security of the file to the client device that did not query for the information describing the security of the file based on determining that the client device operates in the specified language.

14. The computer-implemented method of claim 1, further comprising, after delivering the information describing the security of the file to the client device that did not query for the information describing the security of the file:
    determining that the threshold number of client devices querying for the information describing the security of the file has dropped a threshold amount within a subsequent threshold amount of time;
    after determining that the threshold number of client devices querying for the information describing the security of the file has dropped the threshold amount within the subsequent threshold amount of time, only delivering the information describing the security of the file to client devices that query for the information describing the security of the file.

15. The computer-implemented method of claim 1, wherein determining that the threshold number of client devices are querying for the information describing the security of the file comprising receiving a query for the information describing the security of the file from each client device within the threshold number of client device, the query comprising a hash of the file.

16. A system for anticipating file-security queries, the system comprising:
    a monitoring module, stored in memory, that monitors queries from a plurality of client devices for information that describes the security of files;
    a determination module, stored in memory, that determines that a threshold number of client devices within the plurality of client devices are querying for information describing the security of a file within a threshold amount of time;
    an anticipation module, stored in memory, that anticipates, based on the determination, that at least one client device that did not query for the information describing the security of the file will query for the information describing the security of the file;
    a delivering module, stored in memory, that delivers, in response to anticipating that the client device that did not query for the information describing the security of the file will query for the information describing the security of the file, the information describing the security of the file to the client device that did not query for the information describing the security of the file;

at least one physical processor that executes the monitoring module, the determination module, the anticipation module, and the delivering module.

17. The system of claim 16, wherein:

the determination module further determines that a threshold number of the client devices querying for the information describing the security of the file are also, within the threshold amount of time, querying for information describing the security of an additional file;

the anticipation module further anticipates, based on the determination that the threshold number of the client devices querying for the information describing the security of the file are also, within the threshold amount of time, querying for the information describing the security of the additional file, that a client device that queried for the information describing the security of the file, but did not query for the information describing the security of the additional file, will query for the information describing the security of the additional file;

the delivering module further delivers, in response to anticipating that the client device that queried for the information describing the security of the file, but did not query for the information describing the security of the additional file, will query for the information describing the security of the additional file, the information describing the security of the additional file to the client device that queried for the information describing the security of the file, but did not query for the information describing the security of the additional file.

18. The system of claim 17, wherein the anticipation module anticipates that the client device that queried for the information describing the security of the file, but did not query for the information describing the security of the additional file, will query for the information describing the security of the additional file by:

inferring that the file and the additional file comprise files of a same container file that acts as a container for a plurality of files comprising at least the file and the additional file;

anticipating that the client device that queried for the information describing the security of the file, but did not query for the information describing the security of the additional file, will query for information describing the security of every file included in the container file.

19. The system of claim 18, wherein the container file comprises at least one of:

a compressed file;

an installer file;

a patch update.

20. A non-transitory computer-readable medium comprising one or more computer-readable instructions that, when executed by at least one processor of a computing device, cause the computing device to:

monitor queries from a plurality of client devices for information that describes the security of files;

determine that a threshold number of client devices within the plurality of client devices are querying for information describing the security of a file within a threshold amount of time;

anticipate, based on the determination, that at least one client device that did not query for the information describing the security of the file will query for the information describing the security of the file;

deliver, in response to anticipating that the client device that did not query for the information describing the security of the file will query for the information describing the security of the file, the information describing the security of the file to the client device that did not query for the information describing the security of the file.

\* \* \* \* \*